United States Patent Office 3,160,397
Patented Dec. 8, 1964

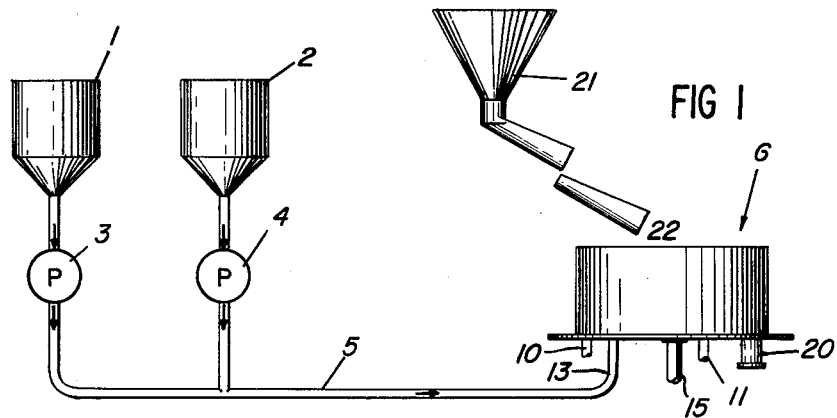
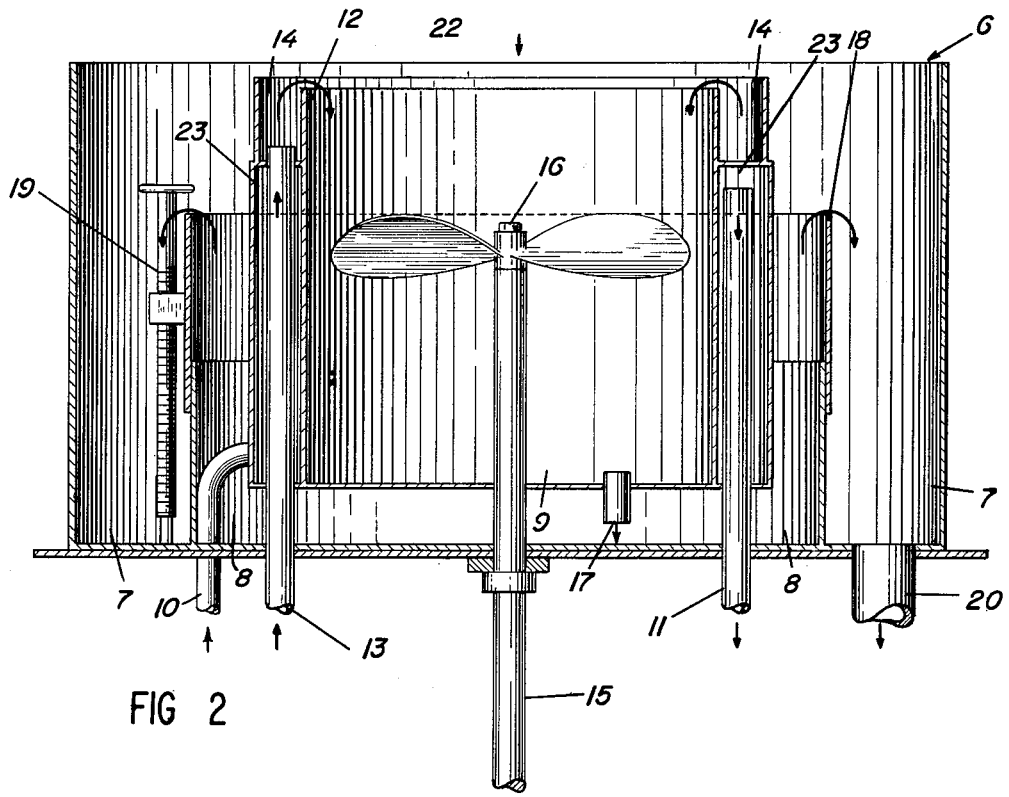
INVENTOR,
Andre' Kelecom

3,160,397
METHOD AND APPARATUS FOR THE CONTINUOUS DISSOLUTION OF CHEMICAL COMPOUNDS
André Kelecom, Uccle-Brussels, Belgium, assignor to UCB (Union Chimique-Chemische Bedrijven) S.A., a corporation of Belgium
Filed Mar. 21, 1962, Ser. No. 181,260
Claims priority, application Netherlands, Mar. 22, 1961, 262,675
2 Claims. (Cl. 259—97)

The present invention relates to a method of continuous dissolution of chemical compounds in general and more particularly of artificial or synthetic polymers for the production of threads, fibres, foils, films, resins, plastic materials, coatings, varnishes, adhesives, and so on.

The present invention likewise relates to an apparatus permitting the continuous dissolution of these products by the method claimed.

In known methods the dissolution is carried out in vertical tanks having an agitation device acting on the entire mass contained in the tank. These tanks have the well-known disadvantage of forming balls of the chemical compounds used, which require hours and sometimes even days for their complete dissolution.

It is obvious that the prolongation of the dissolution time always induces deterioration, aging, and/or discoloration of the substance or substances dissolved. These modifications are particularly undesirable in the preparation of products which are desired to be colorless.

Apparatus used up to the present time have on the whole relatively large dimensions for a determined dissolution capacity.

The present invention has the object of obviating these disadvantages by means of a method which effects perfectly homogeneous dissolution in a short period of time with the aid of an apparatus of small dimensions, thus making it possible to incorporate this dissolution in a continuous process.

Likewise it relates to an apparatus permitting the application of this method.

This method comprises introducing the liquid solvent and the product to be dissolved continuously, in accurately measured quantities, at the top of a tank of small dimensions in which as soon as they enter they are subjected to the action of an agitator acting in a horizontal plane.

The apparatus comprises a small vertical cylindrical tank provided with a rotating shaft which carries at its top end a horizontal propeller the height of which can be regulated so that it is just immersed in the mixture of the liquid solvent and the material to be dissolved.

According to one form of construction of the apparatus, the slurrying process comprises the introduction of the chemical compound and of the liquid solvent, both of which may if desired be conditioned, by means of measuring apparatus (balance and pump) into a small vertical cylindrical tank equipped with the propeller of the agitator and with double walls in order to permit the heating or cooling of the dissolution reagents and of the mixture.

The position of the propeller of the agitator is regulable in relation to the level of the liquid or of the mixture in order that the propeller may be just immersed, thus accelerating mixing and preventing the formation of balls.

The liquid solvent is introduced into the dissolution tank by overflowing or trickling from above. This procedure makes it possible to prevent the materials to be dissolved from sticking to the wall of the tank and in addition makes it possible to heat or cool the dissolution reagents by contact with the conditioned double wall. The materials to be dissolved, and any charges, pigments, agents, auxiliaries, plasticizers, etc. are introduced in measured quantities from above into the tank.

The cylinder wall is perforated near the bottom, so as to permit the passage of the mixture into an intermediate tank, whence by overflowing at the top it pours into an external cylinder whence it is if desired conducted towards intrinsically known heating devices bringing the material to a temperature such that the dissolution is completed within a very short period of time.

The invention will be better understood from the detailed description given thereof below, with the aid of drawings.

FIGURE 1 shows a diagrammatic view of the apparatus permitting continuous dissolution;

FIGURE 2 shows a view of the apparatus according to the invention.

According to FIGURE 1, the liquid solvent or solvents contained in the tanks 1 and 2, to be mixed with the chemical compounds contained in the hopper 21, is or are pumped by individual pumps 3 and 4 of a type known per se and supplied through the single pipe 5 to the apparatus 6.

The apparatus 6, of which FIGURE 2 shows an enlarged view, comprises three concentric vertical tanks, 7, 8, and 9, of which tank 9 has double walls for the conditioning of the liquid solvent or solvents, and of the internal tank itself.

The heating or cooling medium, as the case may be, enters at 10, passes through the annular space 23, and after having conditioned the liquid solvent or solvents supplied at 13 and distributed concentrically in the annular space 14, leaves at 11. The liquid solvent or solvents supplied at 13 and travelling through the annular space 14 overflows or overflow at the top part of the inside tank 9 and continuously bathes or bathe the wall 12. The agitation device comprises a rotating shaft 15 carrying at its top end a horizontal propeller 16, the height of which can be regulated by known means (not shown), so that it is just immersed in the mixture of the liquid solvent and the material to be dissolved introduced at 22 at the top part of the inside tank 9.

The mixture of liquid and chemical compound flows off by gravity through the passage 17 provided near the bottom of the inside tank 9. The mixture overflows at the top of the wall 18 of the intermediate tank 8, the height of which, which determines the level of the mixture in the inside tank 9, can be regulated by the screw 19. The mixture flows into the outside tank 7 and is evacuated through the pipe 20.

The chemical compound or compounds can be introduced at 22 into the apparatus 6, as shown diagrammatically in FIGURE 1, by means of a hopper 21, in quantities, measured by known means (not shown). The mixture passes by gravity from the tank 9 to 8 and 7 and is discharged through the pipe 20.

Depending on the temperature to which the liquid solvent and the mixture have been brought, the dissolution may be complete or incomplete at the outlet of the apparatus. In the second case, the mixture is delivered by known means to apparatus of known types in which the mixture is reheated to a temperature such that the dissolution is completed within a very short period of time.

As the apparatus claimed by applicant works continuously and is of very small dimensions, manufacturing techniques requiring a dissolution process are greatly simplified.

In addition, the small capacity of the dissolution apparatus makes it possible if desired to avoid degradation or aging.

Thus, in the case of the preparation of a solution of polyacrylonitrile or one of its copolymers, it is possible by means of the apparatus of the type claimed and of a volume of about 150 liters (inside tank), to produce about 50 tons per day of dope or dissolved mixture.

This non-limitative example shows the enormous advantages of the utilisation of the method and apparatus forming the object of the invention.

As other non-limitative examples, mention may be made of the dissolution of cellulose ethers or esters in caustic soda for the spinning of pigmented viscose, the dissolution of cellulose xanthogenate in caustic soda for the preparation of viscose, the dissolution of cellulose acetate in acetone, and the preparation of varnishes or adhesives.

I claim:
1. A continuous process for dissolving a solid chemical compound in a solvent therefor which comprises introducing said solvent into a zone of homogenization, bringing the said chemical compound into first contact with said solvent at said zone of homogenization, subjecting the thus-contacted solid and solvent to vigorous agitation in a horizontal plane at said zone of homogenization whereby the said chemical compound and said solvent are homogenized preventing the formation of balls and continuously withdrawing the resultant homogenized mixture into contact with additional solvent in a dissolving zone juxtaposed to said horizontal zone and which is substantially free from agitation, and finally withdrawing the resultant solution of said compound dissolved in said solvent.

2. An apparatus for continuously dissolving solid chemical compounds, particularly compounds selected from the group consisting of artificial and synthetic polymers, in a solvent, comprising (a) an external, vertical, cylindrical tank for withdrawal of the final mixture, (b) a central tank having inlet means for receiving the ingredients, and (c) a level regulating intermediate tank communicating with the external tank by means of an overflow; means for regulating the height of the intermediate tank; a passage leading from the lower portion of the central tank to that of the intermediate tank; a thermo-regulating jacket surrounding the central tank; agitating means mounted in the central tank and comprising a vertically adjustable central shaft carrying at its top end a horizontal propeller the height of which is varied so that said propeller is just immersed in the mixture contained in the central tank; means for feeding the solvent through said jacket and communicating with the upper portion of said central tank; means for introducing the solid compound into the central tank; and outlet means for discharging the final mixture at the base of the external tank.

References Cited by the Examiner
UNITED STATES PATENTS

| | | | |
|---|---|---|---|
| 1,934,916 | 11/33 | Dies | 259—97 |
| 2,738,174 | 3/56 | Magnant et al. | 259—96 |
| 3,051,455 | 8/62 | Magester | 259—97 |

WALTER A. SCHEEL, *Primary Examiner.*